(12) United States Patent
Yugou

(10) Patent No.: US 7,557,460 B2
(45) Date of Patent: Jul. 7, 2009

(54) ELECTRIC POWER SOURCE FOR MOTOR VEHICLE

(75) Inventor: Masaki Yugou, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 273 days.

(21) Appl. No.: 11/808,330

(22) Filed: Jun. 8, 2007

(65) Prior Publication Data

US 2007/0291425 A1    Dec. 20, 2007

(30) Foreign Application Priority Data

Jun. 15, 2006    (JP) .............................. 2006-166442

(51) Int. Cl.
*H02H 7/18*    (2006.01)

(52) U.S. Cl. .................................... 307/10.7

(58) Field of Classification Search ................ 307/10.1, 307/10.7; 361/23
See application file for complete search history.

(56) References Cited

U.S. PATENT DOCUMENTS

| | | | | |
|---|---|---|---|---|
| 5,336,934 | A | * | 8/1994 | Toepfer et al. ............ 307/10.1 |
| 2007/0221627 | A1 | * | 9/2007 | Yugou et al. ................ 218/136 |

FOREIGN PATENT DOCUMENTS

JP    2004-1652    1/2004

* cited by examiner

*Primary Examiner*—Albert W Paladini
*Assistant Examiner*—Michael Rutland Wallis
(74) *Attorney, Agent, or Firm*—Wenderoth, Lind & Ponack, L.L.P.

(57) ABSTRACT

An electric power source for a motor vehicle is so constructed and arranged that an interlock circuit detects a disconnected state of an interlock wire and turns off a contactor. The interlock circuit includes: a current output circuit outputting a detectable current via a diode to the interlock wire; a first current detection subcircuit connected via the interlock wire and the diode to the current output circuit; a second current detection subcircuit connected to a connection point operatively located between the current output circuit and the diode; and a judgment circuit. In the interlock circuit, when the detectable current is detected at the second current detection subcircuit and when the detectable current is not detected at the first current detection subcircuit, the judgment circuit judges the interlock wire to be in a disconnected state and cuts off the contactor.

12 Claims, 6 Drawing Sheets

FIG.4

| STATE | CURRENT OUTPUT CIRCUIT | | CURRENT OUTPUT CIRCUIT | | JUDGMENT |
|---|---|---|---|---|---|
| | FIRST CURRENT OUTPUT SUBCIRCUIT | SECOND CURRENT OUTPUT SUBCIRCUIT | FIRST CURRENT OUTPUT SUBCIRCUIT | SECOND CURRENT OUTPUT SUBCIRCUIT | |
| A | OUTPUTTED | | NOT DETECTED | DETECTED | INTERLOCK WIRE DISCONNECTED |
| B | OUTPUTTED | NOT OUTPUTTED ↓ OUTPUTTED | NOT DETECTED ↓ NOT DETECTED | NOT DETECTED ↓ NOT DETECTED | INTERLOCK WIRE SHORT-CIRCUITED TO GROUND |
| C | OUTPUTTED | NOT OUTPUTTED ↓ OUTPUTTED | NOT DETECTED ↓ DETECTED OR | NOT DETECTED ↓ DETECTED | FAILURE OF FIRST CURRENT OUTPUT SUBCIRCUIT |
| D | OUTPUTTED ↓ NOT OUTPUTTED | | DETECTED ↓ DETECTED | DETECTED ↓ NOT DETECTED | SHORT-CIRCUITED TO ELECTRIC SOURCE |
| E | OUTPUTTED ↓ NOT OUTPUTTED | | DETECTED ↓ DETECTED | DETECTED ↓ DETECTED | FAILURE OF CURRENT OUTPUT CIRCUIT |

ELECTRIC POWER SOURCE FOR MOTOR VEHICLE

BACKGROUND OF THE INVENTION

1. Field of the Invention

The present invention relates generally to an electric power source for a motor vehicle and, in particular, to an electric power source for a motor vehicle, in which a voltage outputted from a battery is shut off when an interlock wire is in a disconnected state.

2. Description of the Related Art

FIG. 1 is a circuit diagram showing a background art electric power source for a motor vehicle. The power source has a battery 31 of its own connected via an output connector 41 to a vehicle side. In this power source, when the output connector 41 is detached, an output terminal 46 of the power source becomes exposed to the outside. Since the output terminal 46 remains connected to the battery 31 which produces a high-voltage direct current, there is a contactor 32 provided for shutting off a power supplied from the electric source in order to prevent an operator or user from getting an electric shock while the output connector 41 is detached. An interlock circuit 33 is provided in order to turn off the contactor 32 while the output connector 41 is detached. The interlock circuit 33 is adapted to turn off the contactor 32 when a disconnected state is detected of an interlock wire 34 which is provided to the output connector 41. This is possible because when the output connector 41 is detached, the interlock wire 34 also comes to a disconnected state.

The shown power source is also provided with an interlock switch 44 that is connected in series to the battery 31. The interlock switch 44 serves to enhance safety and security by shutting off a voltage outputted from the power source, like when the power source is being repaired. The interlock switch 44 is manually operated like when the power source is repaired, or the switch is turned off from its "on" state when it is detected that a casing is opened. The power source with such interlock switch 44 facilitates maintenance to be carried out safely by breaking an output circuit. This power source has a detection switch 45, connected in series to the interlock wire 34, for detecting an on-and-off state of the interlock switch 44, so that when the interlock switch 44 is turned off, the contactor 32 connected to the output side of the battery 31 is turned off for enhanced safety. There has certainly been developed a power source having interlock switch connected in series to battery as described above (refer to Japanese Laid-Open Patent Publication No. 2004-1652).

SUMMARY OF THE INVENTION

The power source equipped with the interlock circuit 33, as shown in FIG. 1, is able to enhance safety by turning off the contactor 32 when the interlock wire 34 is in a disconnected state. The shown interlock circuit 33 includes a current output circuit 36 for outputting a detectable current to the interlock wire 34 and a current detection circuit 37 for detecting the detectable current outputted from the current output circuit 36, so that a disconnected state of the interlock wire 34 is judged, based on the detectable current which is detected by the current detection circuit 37. In this power source, however, the interlock wire 34 may happen to be short-circuited either to ground or to a 12V power circuit (not shown) which supplies a power to the interlock circuit 33. When the interlock wire 34 is short-circuited to ground, the current detection circuit 37 comes to a state of being unable to detect a detectable current, which results in a wrong judgment that the interlock wire 34 is in a disconnected state. As such, this particular power source suffers the disadvantage that even when the output connector 41 remains connected, the contactor 32 will be turned off to shut off the output voltage. Also, when the interlock wire 34 is short-circuited to the power circuit for the interlock circuit 33, the current detection circuit 37 will still detect a detectable current even in a state where a detectable current is not outputted from the current output circuit 36, so that it becomes impossible to judge a failure of the current output circuit 36.

The present invention has, therefore, been made with a view to overcoming such drawback as described above. It is the primary object of this invention to provide an electric power source for a motor vehicle, in which a failure of an interlock circuit is judged, as well as a disconnected state of an interlock wire is accurately detected so that a contactor can be positively cut off.

In order to accomplish the above-mentioned object, the electric power source for a motor vehicle in accordance with the present invention is constructed and arranged as described below.

The electric power source for a motor vehicle includes a battery 1, a contactor 2 shutting off a voltage which is outputted from the battery 1, and an interlock circuit 3 controlling the contactor 2, the interlock circuit 3 detecting a disconnected state of an interlock wire 4 and turning off the contactor 2 to shut off a power supplied from the battery 1. The interlock circuit 3 includes: a current output circuit 6 outputting a detectable current via a diode 5 to the interlock wire 4; a first current detection subcircuit 7A, connected via the interlock wire 4 and the diode 5 to the current output circuit 6, for detecting the detectable current which is outputted from the current output circuit 6; a second current detection subcircuit 7B, connected to a connection point 9 operatively located between the current output circuit 6 and the diode 5, for detecting the detectable current which is outputted from the current output circuit 6; and a judgment circuit 8 judging a disconnected state of the interlock wire 4, based on the detectable current which is detected at the first current detection subcircuit 7A and the second current detection subcircuit 7B, and thus cutting off the contactor 2. In the interlock circuit 3, when the detectable current is detected at the second current detection subcircuit 7B and when the detectable current is not detected at the first current detection subcircuit 7A, the judgment circuit 8 judges the interlock wire 4 to be in a disconnected state and thus cuts off the contactor 2.

The above-described electric power source for a motor vehicle carries the advantage that a failure of an interlock circuit is judged, as well as a disconnected state of an interlock wire is accurately detected so that a contactor can be positively cut off. This is made possible because the inventive power source for a motor vehicle employs the interlock circuit with a unique circuit structure so as to detect the disconnected state of the interlock wire, turn off the contactor, and shut off the power supplied from the battery. In the inventive electric power source, the interlock circuit includes a current output circuit outputting a detectable current via a diode to an interlock wire, a first current detection subcircuit connected via the interlock wire and the diode to the current output circuit, and a second current detection subcircuit connected to a connection point operatively located between the current output circuit and the diode, so that when the detectable current is detected at the second current detection subcircuit and when the detectable current is not detected at the first current detection subcircuit, the interlock wire is judged to be in a disconnected state. Unlike a conventional system where a single current detection circuit judges a connected state of an interlock wire, the inventive interlock circuit is so arranged that a judgment is made on a connected state of the interlock wire, based on a detected state by the first current detection subcircuit connected to the interlock wire and on a detected state by the second current detection subcircuit connected to the current output circuit. As such, the disconnected state of the interlock wire can be more accurately detected to positively cut off the contactor.

In the electric power source for a motor vehicle in accordance with the present invention, the current output circuit 6 includes a first current output subcircuit 6A and a second current output subcircuit 6B, and the judgment circuit 8 is adapted to control an output state of the first current output subcircuit 6A and the second current output subcircuit 6B.

The above-described electric power source for a motor vehicle carries the advantage that since the detectable current is outputted from the current output circuit which is composed of the first and second current output subcircuits, the connected state of the interlock wire can be accurately judged even if either one of the current output subcircuits is in failure. In particular, the inventive electric power source carries the advantage that since the judgment circuit controls an output state of the first and second current output subcircuits, a failure of either one of the current output subcircuits can be accurately judged by switching an output from the first current output subcircuit or the second current output subcircuit so that the detectable current is detected at the first or second current detection subcircuit.

The electric power source for a motor vehicle in accordance with the present invention has an interlock switch 14 connected in series to the battery 1, and a detection switch 15 detecting an on-off state of the interlock switch 14 is connected in series to the interlock wire 4, so that when the interlock switch 14 is turned off, the judgment circuit 8 is able to judge the interlock wire 4 to be in a disconnected state and turns off the contactor 2.

In the electric power source for a motor vehicle in accordance with the present invention, the interlock wire 4 can be connected to a vehicle side via an output connector 11 connecting an output terminal of the battery 1 to the vehicle side. In this electric power source, when the output connector 11 is detached, the interlock wire 4 comes to a disconnected state, so that the contactor 2 can be turned off to shut off the power outputted from the battery 1.

In the electric power source for a motor vehicle in accordance with the present invention, when both of the first current detection subcircuit 7A and the second current detection subcircuit 7B are operable to detect the detectable current, the judgment circuit 8 controls the current output circuit 6 not to output; then if the detectable current is detected at the first current detection subcircuit 7A and if the detectable current is not detected at the second current detection subcircuit 7B, the judgment circuit 8 is able to judge the interlock wire 4 to be short-circuited to the electric source for either the interlock circuit 3 or the vehicle side.

The above-described electric power source for a motor vehicle carries the advantage that a short circuit of the interlock wire to the power source for either the interlock circuit or the vehicle side can be positively judged. This is made possible because, with both of the first and second current detection subcircuits being operable to detect the detectable current, the judgment circuit controls the current output circuit not to output; then if the detectable current is detected at the first current detection subcircuit and if the detectable current is not detected at the second current detection subcircuit, the interlock wire is judged to be short-circuited to the electric source for either the interlock circuit or the vehicle side. Ordinarily, with the current output circuit being controlled not to output, the detectable current is not detected at the current detection circuit. On the other hand, with the above configuration, when the first current detection subcircuit detects the current, a source current is considered to have been detected because the interlock wire is short-circuited to the electric source for either the interlock circuit or the vehicle side. In this instance, the source current is not detected at the second current detection subcircuit because the second current detection subcircuit is connected via the diode to the interlock wire. Thus, in such state, the interlock wire can be judged to be short-circuited to the electric source for either the interlock circuit or the vehicle side.

In the electric power source for a motor vehicle in accordance with the present invention, when both of the first current detection subcircuit 7A and the second current detection subcircuit 7B are operable to detect the detectable current, the judgment circuit 8 controls the current output circuit 6 not to output; then if the detectable current is detected at the first current detection subcircuit 7A and the second current detection subcircuit 7B, the judgment circuit 8 is able to judge the current output circuit 6 to be in failure.

The above-described electric power source for a motor vehicle carries the advantage that the failure of the current output circuit can be positively judged. It is because, with both of the first and second current detection subcircuits being operable to detect the detectable current, the judgment circuit controls the current output circuit not to output; then if the detectable current is detected at the first and second current detection subcircuits, the current output circuit is judged to be in failure. Ordinarily, with the current output circuit being controlled not to output, the detectable current is not detected at the current detection circuit. On the other hand, with the above configuration, when both of the first and second current detection subcircuits detect the current, the current output circuit is considered to be in an output state because the current output circuit is not properly controlled for not outputting. That is to say, in such state, the current output circuit can be judged to be in failure.

In the electric power source for a motor vehicle in accordance with the present invention, the judgment circuit 8 controls the first current output subcircuit 6A to output and the second current output subcircuit 6B not to output, with both of the first current detection subcircuit 7A and the second current detection subcircuit 7B not detecting the detectable current; then if the judgment circuit 8 controls the second current output subcircuit 6B to output and if the detectable current is not detected at the first current detection subcircuit 7A and the second current detection subcircuit 7B, the judgment circuit 8 is able to judge the interlock wire 4 to be short-circuited to ground.

In the electric power source for a motor vehicle in accordance with the present invention, the judgment circuit 8 controls the first current output subcircuit 6A to output and the second output subcircuit 6B not to output, with both of the first current detection subcircuit 7A and the second current detection subcircuit 7B not detecting the detectable current; then if the judgment circuit 8 controls the second current output subcircuit 6B to output and if the detectable current is detected at either or both of the first current detection subcircuit 7A and the second current detection subcircuit 7B, the judgment circuit 8 is able to judge the first current output subcircuit 6A to be in failure.

The above-described electric power source for a motor vehicle carries the advantage that the interlock wire can be positively judged to be short-circuited to ground. It is because, with the judgment circuit controlling the first current output subcircuit to output and the second current output subcircuit not to output, both of the first and second current detection subcircuits do not detect the detectable current; then if the judgment circuit controls the second current output subcircuit to output and if the detectable current is not detected at the first and second current detection subcircuits, the judgment circuit judges the interlock wire to be short-circuited to ground. Ordinarily, with the first and second current output subcircuits being alternatively switched to output, at least one of the first and second current detection subcircuits detects the current. On the other hand, in such state, when both of the first and second current detection subcircuits do not detect the current, the detectable current is considered to be grounded because the interlock wire is short-circuited to ground. Thus, in such state, the interlock wire can be judged to be short-circuited to ground.

The above and further objects of the present invention as well as the features thereof will become more apparent from the following detailed description to be made in conjunction with the accompanying drawings.

BRIEF DESCRIPTION OF THE DRAWINGS

FIG. 4 is a table describing a judgment state by a judgment circuit provided in the interlock circuit shown in FIG. 3;

DETAILED DESCRIPTION OF THE PREFERRED EMBODIMENT(S)

Figure 1:
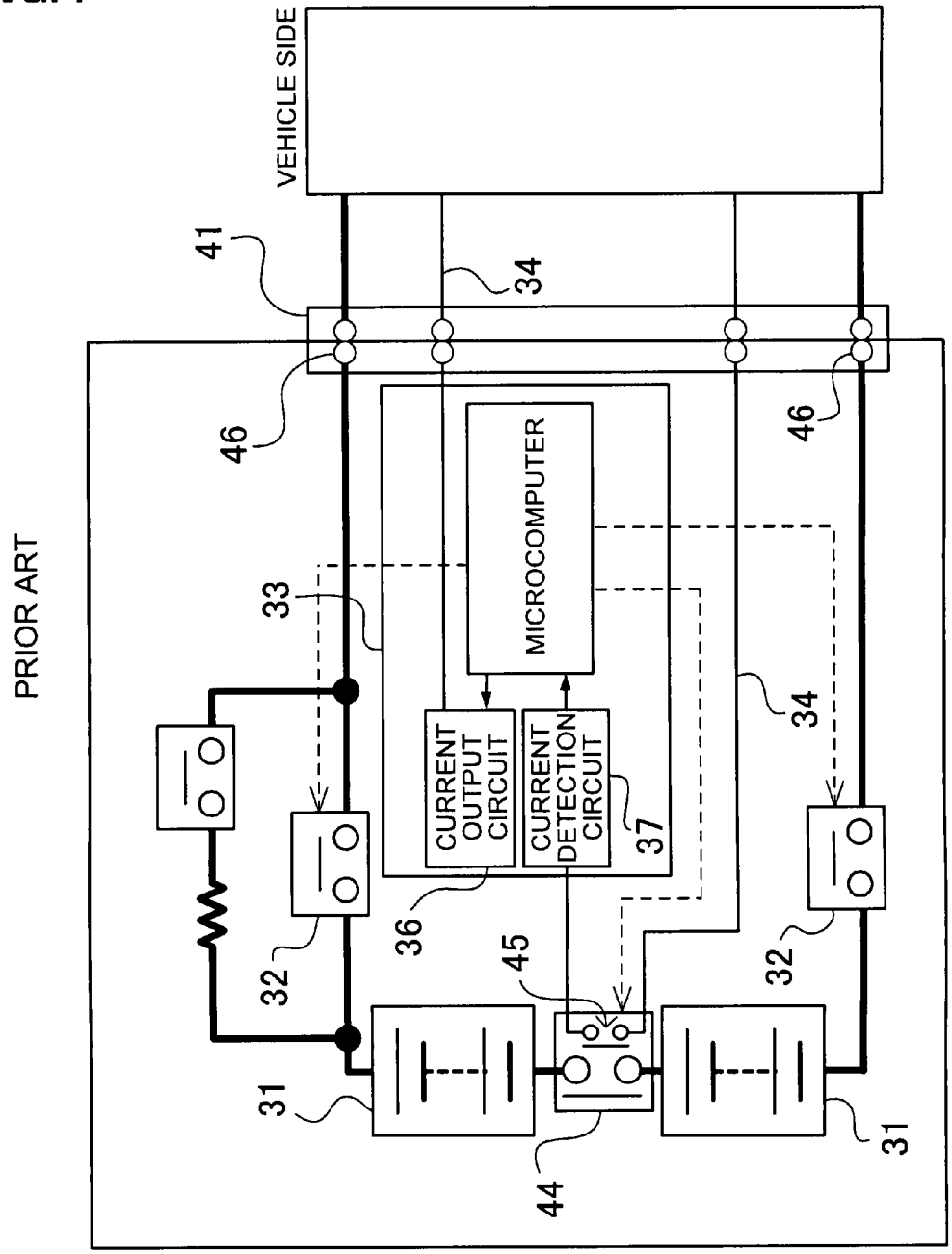
FIG. 1 is a diagram schematically showing a configuration of a conventional electric power source for a motor vehicle.
Figure 2:
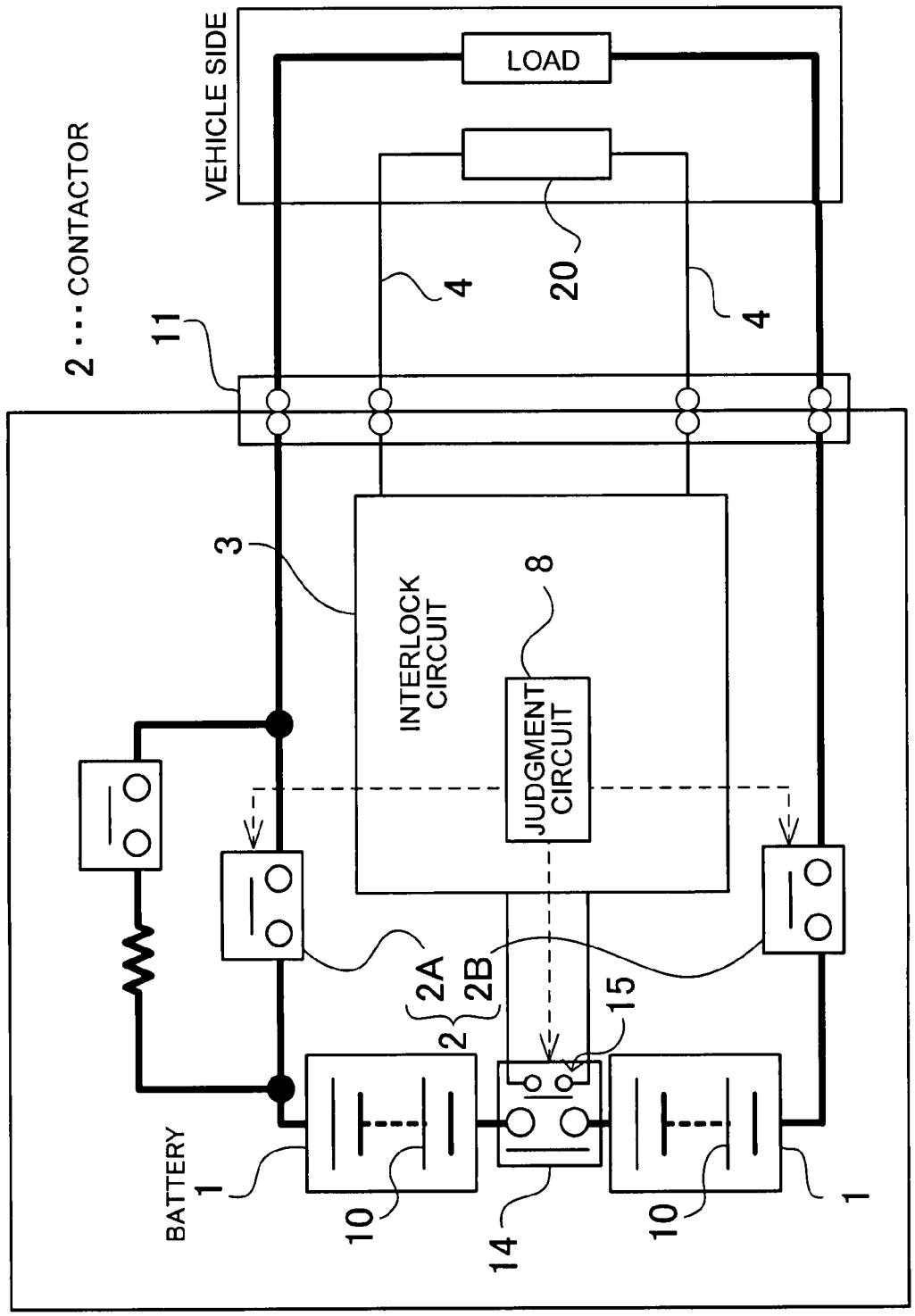
FIG. 2 is a schematic diagram showing a configuration of the electric power source for a motor vehicle in accordance with one embodiment of the present invention.
Figure 3:
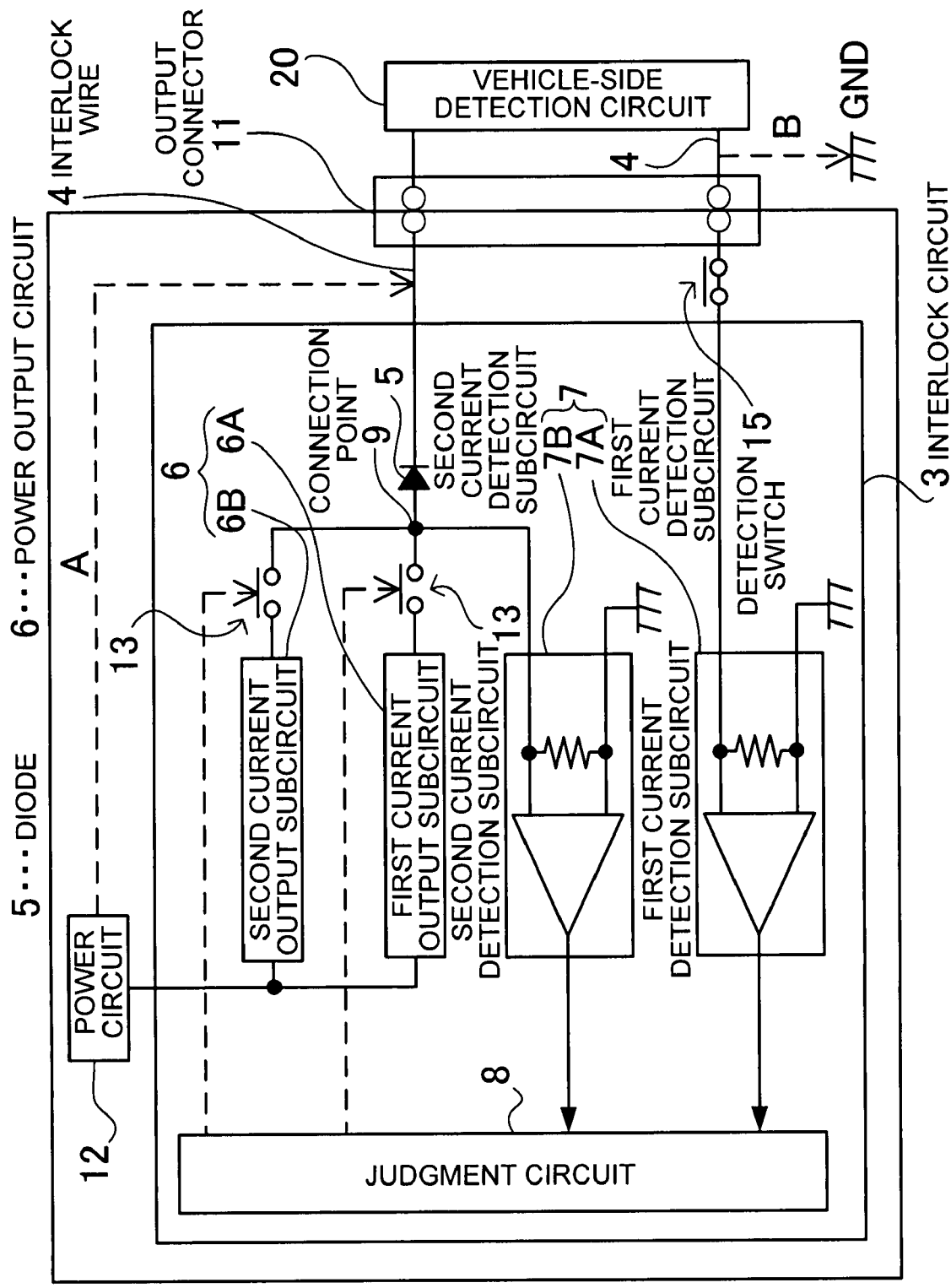
FIG. 3 is a block diagram showing the interlock circuit of the electric power source illustrated in FIG. 2.

The electric power source for a motor vehicle, shown in FIGS. 2 and 3, includes a battery 1, a contactor 2 shutting off a power supplied from the battery 1, and an interlock circuit 3 controlling the contactor 2. The interlock circuit 3 detects a disconnected state of an interlock wire 4 and turns off the contactor 2 to shut off the power supplied from the battery 1.

The battery 1 is employed to drive the motor vehicle and is so arranged that a plurality of secondary batteries 10 are mutually connected in series to output a high voltage of, for example, several hundred volts. The secondary battery 10 may be any kind of rechargeable battery, such as a nickel hydrogen battery and a lithium ion secondary battery.

The contactor 2 is composed of a positive-side contactor 2A and a negative-side contactor 2B, both of which serve to respectively block an output on the positive side and negative side of the battery 1. The positive-side and negative-side contactors 2 (2A and 2B) are simultaneously turned off from an "on" state to block the output on the positive-side and negative-side of the battery 1. The positive-side contactor 2A is connected to and between the battery 1 and the positive side of an output connector 11, while the negative-side contactor 2B is connected to and between the battery 1 and the negative-side of the output connector 11. In order to simultaneously turn off from the "on" state the positive-side and negative-side contactors 2 (2A and 2B), there is an exciting coil connected in parallel or in series for each contactor 2.

The interlock circuit 3 shown in FIG. 3 includes: a current output circuit 6, composed of a first current output subcircuit 6A and a second current output subcircuit 6B, for outputting a detectable current via a diode 5 to the interlock wire 4; a first current detection subcircuit 7A, connected via the interlock wire 4 and the diode 5 to the current output circuit 6, for detecting the detectable current outputted from the current output circuit 6; a second current detection subcircuit 7B, connected to a connection point 9 which is operatively located between the current output circuit 6 and the diode 5, for detecting the detectable current outputted from the current output circuit 6; and a judgment circuit 8 judging a disconnected state of the interlock wire 4, based on the detectable current detected at the first current detection subcircuit 7A and the second current detection subcircuit 7B, and thus cutting off the contactor 2.

The diode 5 is connected in a direction of allowing the detectable current outputted from the current output circuit 6 to flow toward the interlock wire 4 but not to flow toward the current output circuit 6 from the interlock wire 4. The diode 5 serves to block a current flow from the interlock wire 4 toward the second current detection subcircuit 7B when the interlock wire 4 is short-circuited to a power circuit 12 for the interlock circuit 3.

The current output circuit 6 is so constructed and arranged that the first current output subcircuit 6A primarily outputs the detectable current but when the first current output subcircuit 6A is unable to output the detectable current, the second current output subcircuit 6B will output the detectable current on behalf of the first current output subcircuit 6A. To be noted is that when it is detected that the interlock wire 4 is short-circuited to the power circuit 12 for the interlock circuit 3, the first current output subcircuit 6A and the second current output subcircuit 6B are controlled not to output. For a control of an output state, the first current output subcircuit 6A and the second current output subcircuit 6B have an output switch 13 connected respectively on their output sides. The output switch 13 is controlled by the judgment circuit 8 so as to control the state where the current output circuit 6 outputs the detectable current.

The first current detection subcircuit 7A detects the detectable current which flows to the interlock wire 4. The first current detection subcircuit 7A also detects the current which flows to the interlock wire 4 when the interlock wire 4 is short-circuited to the power circuit 12 for the interlock circuit 3, as indicated at chain line A in the Figure, or when the interlock wire is short-circuited to the power circuit for the vehicle side, not shown. The second current detection subcircuit 7B detects the detectable current outputted from the first current output subcircuit 6A and the second current output subcircuit 6B, but when the interlock wire 4 is short-circuited to the power circuit 12 for the interlock circuit 3 or to the power circuit for the vehicle side, the second current detection subcircuit 7B does not detect the current which flows from the power circuit 12 to the interlock wire 4. This is made possible because the diode 5 interrupts the current which flows from the power circuit 12. Thus, the second current detection subcircuit 7B detects only the detectable current outputted from the current output circuit 6.

The judgment circuit 8 controls the output switch 13 to be switched on and off which is connected to the output side of the first current output subcircuit 6A and the second current output subcircuit 6B, so as to control the state where the detectable current is outputted from the first current output subcircuit 6A and the state where the detectable current is outputted from the second current output subcircuit 6B. Further, the judgment circuit 8 also judges the disconnected state of the interlock wire 4, based on the detectable current which is detected at the first current detection subcircuit 7A and on the detectable current which is detected at the second current detection subcircuit 7B. The judgment circuit 8 also judges the short circuit of the interlock wire 4 to ground as well as the short circuit of the interlock wire 4 to the power circuit 12 for the interlock circuit 3 or to the power circuit for the vehicle side.

When both of the first current detection subcircuit 7A and the second current detection subcircuit 7B are operable to detect the detectable current, the judgment circuit 8 judges the interlock wire 4 to be in a connected state This state means a state where the interlock wire 4 is connected to the output connector 11 and a connection is established via the interlock wire 4 to a detection circuit 20 for the vehicle side. The state where the interlock wire 4 is connected to the detection circuit 20 for the vehicle side means the state where the positive side and the negative side of the battery 1 are interconnected with the vehicle side. In such a state, when the contactor 2 is switched on, the power is supplied from the battery 1 to the vehicle.

When the output connector 11 is detached, the interlock wire 4 comes to a disconnected state. Also when the interlock switch 14 is turned off, the interlock wire 4 comes to a disconnected state. This is possible because a detection switch 15 for detecting a state of the interlock switch 14 is connected to the interlock wire 4. The interlock switch 14 is a switch connected in series to the battery 1. The detection switch 15 is provided for detecting an on-off state of the interlock switch 14 and is connected to the interlock wire 4. When the interlock switch 14 is turned off, the detection switch 15 is turned off as well, so that the judgment circuit 8 judges the interlock wire 4 to be in a disconnected state and turns off the contactor 2.

When the interlock wire 4 comes to a disconnected state, the first current detection subcircuit 7A will not detect the detectable current. Also at this stage, since the current output circuit 6 is outputting the detectable current, the second current detection subcircuit 7B will detect the detectable current. Thus, when the first current detection subcircuit 7A does not detect the detectable current and when the second current detection subcircuit 7B detects the detectable current, the judgment circuit 8 judges the interlock wire 4 to be in a disconnected state and turns off the contactor 2. This state is described as State A in FIG. 4.

Further, the interlock wire 4 happens to be short-circuited to ground, as indicated at chain line B in FIG. 3. At this stage, the interlock wire 4 is at ground potential, and the detectable current outputted from the first output subcircuit 6A flows through the interlock wire 4 to ground. Thus, both of the first current detection subcircuit 7A and the second current detection subcircuit 7B are unable to detect the detectable current. However, a failure of the first current output subcircuit 6A may also cause the detectable current not to be outputted. When the detectable current is not outputted from the first current output subcircuit 6A, the detectable current will not be detected at the first current detection subcircuit 7A and the second current circuit 7B. Therefore, in a state where the judgment circuit 8 controls the first current output subcircuit 6A to output and the second current output subcircuit 6B not to output, when the detectable current is not detected at the first current detection subcircuit 7A and the second current detection subcircuit 7B, the output switch 13 which is connected to the output side of the second current output subcircuit 6B is turned on by the judgment circuit 8, so that the detectable current may be outputted from the second current output subcircuit 6B. Even in this state, when the detectable current is not detected at the first current detection subcircuit 7A and the second current detection subcircuit 7B, the interlock wire 4 is judged to be short-circuited to ground, as described as State B in FIG. 4. Also in a state where the detectable current is outputted from the second current output subcircuit 6B, when the detectable current comes to be detected at either or both of the first current detection subcircuit 7A and the second current detection subcircuit 7B, the first current output subcircuit 6A is judged to be in failure, as described as State C in FIG. 4. Thus, when the detectable current is not detected at the first current detection subcircuit 7A and the second current detection subcircuit 7B, the judgment circuit 8 is able to judge the short circuit of the interlock wire 4 to ground and also the failure of the first current output subcircuit 6A. Also in a state where the detectable current is outputted from the second current output subcircuit 6B, when the detectable current is detected at the first current detection subcircuit 7A and the second current detection subcircuit 7B, the judgment circuit 8 judges the interlock wire 4 to be in a connected state. Also when the first current detection subcircuit 7A does not detect the detectable current and when the second current detection subcircuit 7B detects the detectable circuit, the judgment circuit 8 judges the interlock wire 4 to be in a disconnected state.

Therefore, in a state where the detectable current is not detected at the first current detection subcircuit 7A, when the detectable current is outputted from the second current output subcircuit 6B, the judgment circuit 8 is able to judge whether the interlock wire 4 is short-circuited to ground, or the detectable current is not being outputted due to a failure of the first current output subcircuit 6A, or the interlock wire 4 is in a disconnected state.

Also, the interlock wire 4 may happen to be short-circuited either to the low-voltage power circuit 12 for the interlock circuit 3 as indicated at chain line A in FIG. 3 or to a 12V power circuit for the vehicle side. When the interlock wire 4 is short-circuited to the low-voltage power circuit 12, a source current flows from the low-voltage power circuit 12 to the first current detection subcircuit 7A via the interlock wire 4. However, the source current never flows from the low-voltage power circuit 12 to the second current detection subcircuit 7B via the interlock wire 4. It is because the diode 5 placed in a reverse direction of the current flow interrupts the current flow from the interlock wire 4 to the second current detection subcircuit 7B. Therefore, when the interlock wire 4 is short-circuited to the low-voltage power circuit 12, the first current detection subcircuit 7A detects both of the detectable current from the current output circuit 6 and the source current from the low-voltage power circuit 12. Since the detectable current cannot be distinguished from the source current, the first current detection subcircuit 7A is unable to judge whether the current is the detectable current coming from the current output circuit 6 or the source current resulting from the short circuit of the interlock wire 4 to the power circuit 12.

In a state where the detectable current is detected at the first current detection subcircuit 7A and the second current detection subcircuit 7B, the judgment circuit 8 turns off the respective output switch 13 which is connected to the output side of the first current output subcircuit 6A and the second current output subcircuit 6B. Ordinarily, only the output switch 13 of the first current output subcircuit 6A is switched on and the output switch 13 of the second current output subcircuit 6B is switched off, and in this particular instance, only the output switch 13 of the first current output subcircuit 6A is to be turned off. In this state, the detectable current is not outputted from the first current output subcircuit 6A and the second current output subcircuit 6B. In a state where the detectable current is not outputted from the current output circuit 6, when the detectable current is detected at the first current detection subcircuit 7A and when the detectable current is not detected at the second current detection subcircuit 7B, the judgment circuit 8 judges that the source current has flowed because the interlock wire 4 is short-circuited to the low-voltage power circuit 12, as described as State D in FIG. 4. It is because, In a state where the output switches 13 of the first current output subcircuit 6A and the second current output subcircuit 6B are turned off so as not to output the detectable current from the current output circuit 6, when the interlock wire 4 is not short-circuited to the low-voltage power circuit 12, the detectable current should not be detected at the first current detection subcircuit 7A. That is to say, in a state where the detectable current is detected at the first current detection subcircuit 7A and the second current detection subcircuit 7B, when the current output circuit 6 is turned on to output the detectable current and turned off not to output the detectable current, the judgment circuit 8 is able to judge whether the source current has been detected because the interlock wire 4 is short-circuited to the low-voltage power circuit 12, or the detectable current outputted from the current output circuit 6 has been detected without the interlock wire 4 having been short-circuited to the low-voltage power circuit 12.

Further, in a state where the detectable current is detected at the first current detection subcircuit 7A and the second current detection subcircuit 7B, the judgment circuit 8 controls the current output circuit 6 not to output the detectable current; then if the both of the first current detection subcircuit 7A and the second current detection subcircuit 7B remain unchanged from the state of detecting the detectable current, the judgment circuit 8 judges the current output circuit 6 to be in failure, as described as State E in FIG. 4. To be noted in this judgment is that when the first current output subcircuit 6A alone is selected for outputting the detectable current from the current output circuit 6, the first current output subcircuit 6A can be judged to be in failure, and when the second current output subcircuit 6B alone is selected for outputting the detectable current from the current output circuit 6, the second current output subcircuit 6B can be judged to be in failure. That is, a judgment can be made on which of the first current output subcircuit 6A and the second current output subcircuit 6B is in failure, by specifying either one of the first current output subcircuit 6A or the second current output subcircuit 6B as an output source from the current output circuit 6.

Thus, in a state where the detectable current is detected at the first current detection subcircuit 7A and the second current detection subcircuit 7B, when the switch is turned on to output or turned off not to output the detectable current from the current output circuit 6, the judgment circuit 8 is able to judge whether the interlock wire 4 is short-circuited to the low-voltage power circuit 12 or the current output circuit 6 is in failure.

Figure 5:
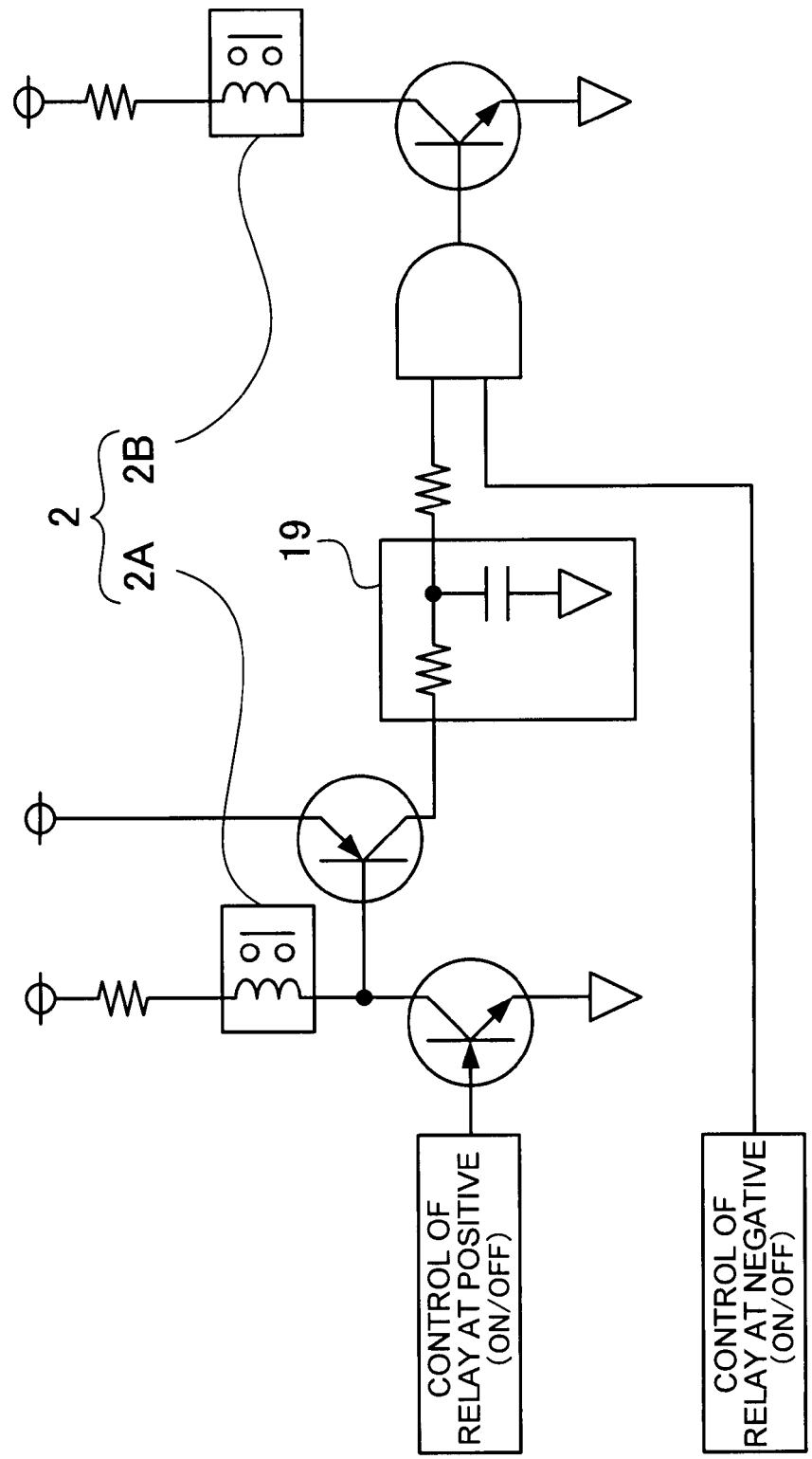
FIG. 5 is a circuit diagram showing an exemplary circuit adapted to control the contactor to be switched on and off in the electric power source shown in FIG. 2.
Figure 6:
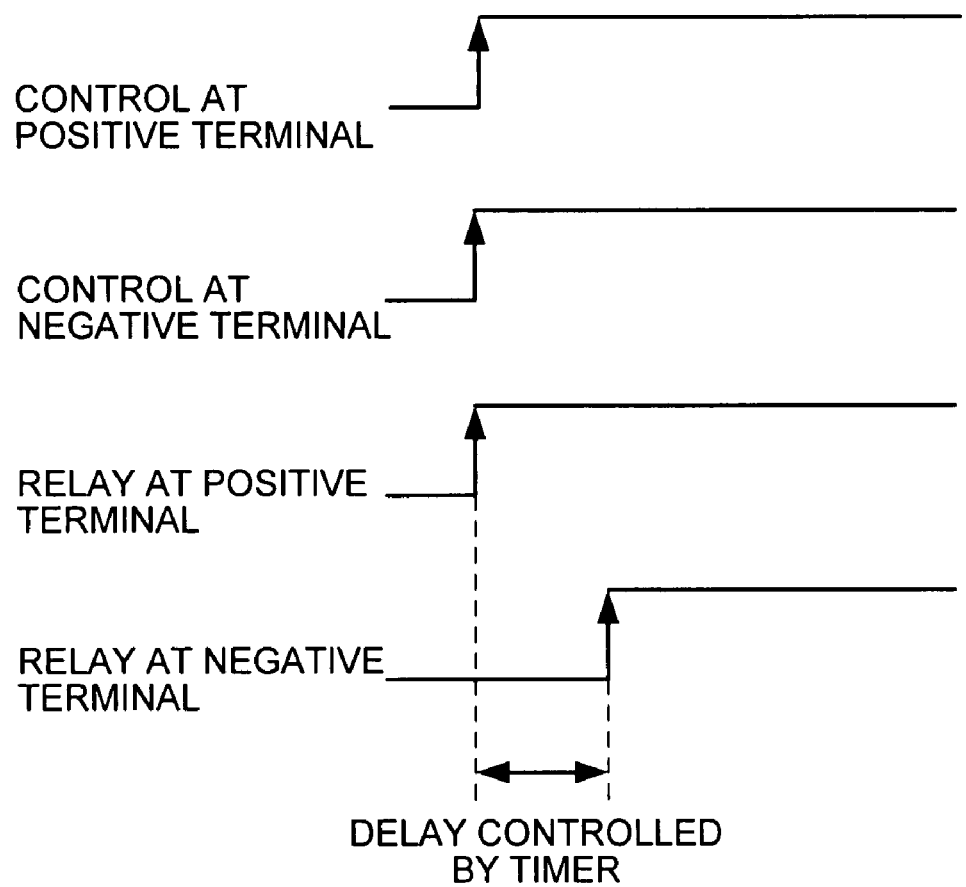
FIG. 6 is a timing graph showing a state where the contactor is switched on and off by the circuit shown in FIG. 5.

Further, in the electric power source as embodied in accordance with the present invention, a timer circuit 19 is employed to serve as a delay circuit, as illustrated in FIGS. 5 and 6. When a positive-side contactor 2A and a negative-side contactor 2B, both of which serve as a relay, are simultaneously switched on/off under the control by a control circuit (not shown), the negative-side contactor 2B can still be switched on in delay. In this arrangement, the relays at the positive terminal and the negative terminal can be configured not to be simultaneously switched on even when the relays are in a chattering state, and thus the two relays can be protected from being electrically welded at one time. Further, when a simultaneously welded state is thus prevented, an output of a high voltage as well as an unwanted discharge of the battery can be prevented.

The above-described construction and arrangement are able to overcome the following disadvantages suffered by a conventional system. Conventionally, an HEV battery system installed in a hybrid vehicle has been of a high voltage, so that separation from the outside (at both the positive and negative outputs) has been done by means of a mechanical relay. Since a large current flows through the relay, the relay contact is prone to be electrically welded at the time of being switched on and off. The relay contact is also likely to become welded in the course of repeated switching operations of the relay due to a voltage drop in a power source adapted to control the relay (a voltage may happen to drop when facing a sudden increase in operation load like by an air conditioner in a vehicle being electrically powered by a lead battery) or due to a failure of a control circuit. Especially when the relay is switched on from its "off" state, a large current is likely to flow, so that when the relay has been welded, a high voltage is outputted and the battery is also discharged, leading to an over discharge in the worst case. In relation to the voltage drop in the power source adapted to control the relay, an output drop of the lead storage battery may also cause the relay to be opened, leading to a malfunction of the HEV battery system and to an eventual vehicle stop. When an auxiliary DC/DC converter, assisted by an output from the lead storage battery, is employed to retain a coil voltage of the contactor, it is possible to inhibit the relay from being opened so as not to cause such vehicle stop.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-166442 filed in Japan on Jun. 15, 2006, the content of which is incorporated herein by reference.

What is claimed is:

1. An electric power source for a motor vehicle, comprising:
   a battery;
   a contactor shutting off a voltage outputted from the battery; and
   an interlock circuit controlling the contactor, the interlock circuit detecting a disconnected state of an interlock wire and turning off the contactor to shut off a power supplied from the battery,
   wherein the interlock circuit comprises:
   a current output circuit outputting a detectable current via a diode to the interlock wire;
   a first current detection subcircuit, connected via the interlock wire and the diode to the current output circuit, for detecting the detectable current outputted from the current output circuit;
   a second current detection subcircuit, connected to a connection point operatively located between the current output circuit and the diode, for detecting the detectable current outputted from the current output circuit; and
   a judgment circuit judging a disconnected state of the interlock wire, based on the detectable current detected at the first current detection subcircuit and the second current detection subcircuit, and thus cutting off the contactor, and wherein when the detectable current is detected at the second current detection subcircuit and when the detectable current is not detected at the first current detection subcircuit, the judgment circuit judges the interlock wire to be in a disconnected state and thus cuts off the contactor.

2. The electric power source for a motor vehicle as recited in claim 1, wherein the current output circuit comprises a first current output subcircuit and a second current output subcircuit, so that the judgment circuit is adapted to control an output state of the first current output subcircuit and the second current output subcircuit.

3. The electric power source for a motor vehicle as recited in claim 1, the electric power source comprising an interlock switch connected in series to the battery, wherein a detection switch detecting an on-and-off state of the interlock switch is connected in series to the interlock wire, so that when the interlock switch is turned off, the judgment circuit is adapted to judge the interlock wire to be in a disconnected state and turns off the contactor.

4. The electric power source for a motor vehicle as recited in claim 1 wherein the interlock wire is connected to a vehicle side via an output connector connecting an output terminal of the battery to the vehicle side, so that when the output connector is detached, the interlock wire comes to a disconnected state, so that the contactor is turned off to shut off the power outputted from the battery.

5. The electric power source for a motor vehicle as recited in claim 1, wherein when both of the first current detection subcircuit and the second current detection subcircuit is operable to detect the detectable current, the judgment circuit controls the current output circuit not to output; then if the detectable current is detected at the first current detection subcircuit and if the detectable current is not detected at the second current detection subcircuit, the judgment circuit judges the interlock wire to be short-circuited to the electric source for either the interlock circuit or the vehicle side.

6. The electric power source for a motor vehicle as recited in claim 1, wherein when both of the first current detection subcircuit and the second current detection subcircuit is operable to detect the detectable current, the judgment circuit controls the current output circuit not to output; then if the detectable current is detected at the first current detection subcircuit and the second current detection subcircuit, the judgment circuit judges the current output circuit to be in failure.

7. The electric power source for a motor vehicle as recited in claim 2, wherein the judgment circuit controls the first current output subcircuit to output and the second current output subcircuit not to output, with both of the first current detection subcircuit and the second current detection subcircuit not detecting the detectable current; then if the judgment circuit controls the second current output subcircuit to output and if the detectable current is not detected at the first current detection subcircuit and the second current detection subcircuit, the judgment circuit judges the interlock wire to be short-circuited to ground.

8. The electric power source for a motor vehicle as recited in claim 2, wherein the judgment circuit controls the first current output subcircuit to output and the second output subcircuit not to output, with both of the first current detection subcircuit and the second current detection subcircuit not detecting the detectable current; then if the judgment circuit controls the second current output subcircuit to output and if the detectable current is detected at either or both of the first current detection subcircuit and the second current detection subcircuit, the judgment circuit judges the first current output subcircuit to be in failure.

9. The electric power source for a motor vehicle as recited in claim 1, wherein the current output circuit has, on an output side thereof, an output switch controlled by the judgment circuit.

10. The electric power source for a motor vehicle as recited in claim 1, wherein the interlock circuit comprises a power source.

11. The electric power source for a motor vehicle as recited in claim 1, wherein the second current detection subcircuit comprises an amplifier having a resister connected on an input side.

12. The electric power source for a motor vehicle as recited in claim 1, wherein positive-side contactor and negative-side contactor are switched on and off in delay under the control by a delay switch.

* * * * *